United States Patent
Velev et al.

(10) Patent No.: US 11,477,702 B2
(45) Date of Patent: *Oct. 18, 2022

(54) FALLBACK ASSISTANCE INFORMATION

(71) Applicant: Lenovo (Singapore) PTE. LTD., New Tech Park (SG)

(72) Inventors: Genadi Velev, Darmstadt (DE); Prateek Basu Mallick, Oberursel (DE); Joachim Loehr, Wiesbaden (DE); Ravi Kuchibhotla, Chicago, IL (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/121,630

(22) Filed: Dec. 14, 2020

(65) Prior Publication Data
US 2021/0176672 A1 Jun. 10, 2021

Related U.S. Application Data

(63) Continuation of application No. 16/197,122, filed on Nov. 20, 2018, now Pat. No. 10,869,234.
(Continued)

(51) Int. Cl.
*H04W 36/00* (2009.01)
*H04W 76/27* (2018.01)
(Continued)

(52) U.S. Cl.
CPC ... *H04W 36/0022* (2013.01); *H04W 36/0033* (2013.01); *H04W 36/0058* (2018.08);
(Continued)

(58) Field of Classification Search
None
See application file for complete search history.

(56) References Cited

U.S. PATENT DOCUMENTS 10,869,234 B2 * 12/2020 Velev ............... H04W 36/0033
2014/0051443 A1 2/2014 Diachina et al.
(Continued)

FOREIGN PATENT DOCUMENTS

| EP | 3506680 A1 | 7/2019 |
| WO | 2017079074 A1 | 5/2017 |
| WO | 2018231813 A1 | 12/2018 |

OTHER PUBLICATIONS

3GPP, "3rd Generation Partnership Project; Technical Specification Group Services and System Aspects; Circuit Switched (CS) fallback in Evolved Packet System (EPS); Stage 2 (Release 14)", 3GPP TS 23.272 V14.0.0, Mar. 2017, pp. 1-103.
(Continued)

*Primary Examiner* — Diane L Lo
(74) *Attorney, Agent, or Firm* — Kunzler Bean & Adamson

(57) ABSTRACT

Apparatuses, methods, and systems are disclosed for providing fallback assistance information to a RAN node. One apparatus includes a transceiver that sends a service request, wherein the service request requires fallback to at least one of: a different RAT and a different system generation, wherein the service request indicates that service fallback is required and receives a connection release message, where the connection release message includes redirection information for the service fallback, the redirection information including a target RAT cell and a target system. The apparatus includes a processor that selecting a NAS protocol from a plurality of NAS protocols supported by the remote unit, wherein the selection is based on the target system and connects to the target RAT and the target system using a procedure of the selected NAS protocol.

19 Claims, 10 Drawing Sheets

Related U.S. Application Data

(60) Provisional application No. 62/588,846, filed on Nov. 20, 2017.

(51) Int. Cl.
*H04W 36/30* (2009.01)
*H04W 76/30* (2018.01)
*H04W 36/08* (2009.01)

(52) U.S. Cl.
CPC ......... *H04W 36/305* (2018.08); *H04W 76/27* (2018.02); *H04W 36/08* (2013.01); *H04W 76/30* (2018.02)

(56) References Cited

U.S. PATENT DOCUMENTS

| | | |
|---|---|---|
| 2017/0188280 A1 | 6/2017 | Watfa et al. |
| 2017/0367036 A1 | 12/2017 | Chen et al. |
| 2018/0132141 A1 | 5/2018 | Huang-Fu et al. |
| 2018/0310215 A1 | 10/2018 | Watfa et al. |
| 2020/0015128 A1 | 1/2020 | Stojanovski et al. |

OTHER PUBLICATIONS

International Searching Authority, "Notification of Transmittal of the International Search report and the Written Opinion of the International Searching Authority, or the Declaration", PCT/IB2018/001507, dated May 3, 2019, pp. 1-11.

Etsi, "Digital cellular telecommunications system (Phase 2+); Universal Mobile Telecommunications System (UMTS); LTE; Circuit Switched (CS) fallback in Evolved Packet System (EPS);Stage 2", (3GPP TS 23.272 version 10.4.0 Release 10), Jun. 2011, pp. 1-80.

Etsi, "LTE; General Packet Radio Service (GPRS) enhancements for Evolved Universal Terrestrial 3adio Access Network (E-UTRAN) access", (3GPP TS 23.401 version 14.3.0 Release 14), May 2017, pp. 1-393.

3GPP, "3rd Generation Partnership Project; Technical Specification Group Services and System Aspects; Procedures for the 5G System; Stage 2" (3GPP TS 23.502 version 1.3.0 Release 15), Nov. 2017, pp. 1-215.

Etsi, "LTE; Evolved Universal Terrestrial Radio Access Network (E-UTRAN); S1 Application Protocol (S1AP)", (3GPP TS 36.413 version 12.3.0 Release 12), Sep. 2014, p. 1-296.

Etsi, "Universal Mobile Telecommunications System (UMTS); Radio Resource Control (RRC); Protocol specification", (3GPP TS 25.331 version 13.1.0 Release 13), pp. 1-2328.

3GPP,"3rd Generation Partnership Project; Technical Specification Group Services and System Aspects; System Architecture for the 5G System; Stage 2", (3GPP TS 23.501 version 1.45.0 Release 15), Nov. 2017, pp. 1-201.

Etsi, "LTE; General Packet Radio Service (GPRS) enhancements for Evolved Universal Terrestrial Radio Access Network (E-UTRAN) access", (3GPP TS 23.401 version 15.1.0 Release 15), Sep. 2017, pp. 1-397.

Oppo, "Discussion on EPC and 5GC Selection during Intra-LTE Handover with CN Type Change", 3GPP TSG-RAN WG2#100 R2-1712222, Nov. 27-Dec. 1, 2017, pp. 1-2.

Oppo, "Discussion on Intra-Cell Handover with CN Type Change", 3GPP TSG-RAN WG2#100 R2-1713742, Nov. 27-Dec. 1, 2017, pp. 1-3.

\* cited by examiner

```
-- ASN1START

RRCConnectionRelease message

RRCConnectionRelease ::=            SEQUENCE {
    rrc-TransactionIdentifier           RRC-TransactionIdentifier,
    criticalExtensions                  CHOICE {
        c1                                  CHOICE {
            rrcConnectionRelease-r8             RRCConnectionRelease-IEs,
            spare3 NULL, spare2 NULL, spare1 NULL
        },
        criticalExtensionsFuture            SEQUENCE {}
    }
}

RRCConnectionRelease-IEs ::=        SEQUENCE {
    releaseCause                        ReleaseCause,
    redirectedCarrierInfo               RedirectedCarrierInfo                   OPTIONAL,   -- Need ON
    redirectedCNTypeInfo                RedirectedCNTypeInfo                    OPTIONAL,   -- Need ON
    idleModeMobilityControlInfo         IdleModeMobilityControlInfo                 OPTIONAL,   -- Need OP
    nonCriticalExtension                RRCConnectionRelease-v890-IEs           OPTIONAL
}

RedirectedCarrierInfo ::=           CHOICE {
    nr                                  ARFCN-ValueNR,
    eutra                               ARFCN-ValueEUTRA,
    geran                               CarrierFreqsGERAN,
    utra-FDD                            ARFCN-ValueUTRA,
    utra-TDD                            ARFCN-ValueUTRA,
    cdma2000-HRPD                       CarrierFreqCDMA2000,
    cdma2000-1xRTT                      CarrierFreqCDMA2000,
    ...,
    utra-TDD-r10                        CarrierFreqListUTRA-TDD-r10
}

RedirectedCNTypeInfo ::=            ENUMERATED {EPS, 5GS}

-- ASN1STOP
```

FIG. 4

FALLBACK ASSISTANCE INFORMATION

CROSS-REFERENCE TO RELATED APPLICATIONS

This application claims priority to U.S. patent application Ser. No. 16/197,122 entitled "Fallback Assistance Information" and filed on Nov. 20, 2018 for Genadi Velev, Prateek Basu Mallick, Joachim Lohr, and Ravi Kuchibhotla, which application claims priority to U.S. Provisional Patent Application No. 62/588,846 entitled "Fallback Assistance Information" and filed on Nov. 20, 2017 for Genadi Velev, Prateek Basu Mallick, Joachim Lohr, and Ravi Kuchibhotla, which applications are incorporated herein by reference.

FIELD

The subject matter disclosed herein relates generally to wireless communications and more particularly relates to providing fallback assistance information to a RAN node.

BACKGROUND

The following abbreviations are herewith defined, at least some of which are referred to within the following description: Third Generation Partnership Project ("3GPP"), Positive-Acknowledgment ("ACK"), Autonomous Uplink ("AUL"), AUL Downlink Feedback Information ("AUL-DFP"), Binary Phase Shift Keying ("BPSK"), Clear Channel Assessment ("CCA"), Cyclic Prefix ("CP"), Cyclical Redundancy Check ("CRC"), Channel State Information ("CSI"), Common Search Space ("CSS"), Discrete Fourier Transform Spread ("DFTS"), Downlink Control Information ("DCI"), Downlink ("DL"), Downlink Pilot Time Slot ("DwPTS"), Enhanced Clear Channel Assessment ("eCCA"), Enhanced Licensed Assisted Access ("eLAA"), Enhanced Mobile Broadband ("eMBB"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Frequency Division Orthogonal Cover Code ("FD-OCC"), Guard Period ("GP"), Hybrid Automatic Repeat Request ("HARQ"), Internet-of-Things ("IoT"), Licensed Assisted Access ("LAA"), Load Based Equipment ("LBE"), Listen-Before-Talk ("LBT"), Long Term Evolution ("LTE"), Multiple Access ("MA"), Modulation Coding Scheme ("MCS"), Machine Type Communication ("MTC"), Multiple Input Multiple Output ("MIMO"), Multi User Shared Access ("MUSA"), Narrowband ("NB"), Negative-Acknowledgment ("NACK") or ("NAK"), Next Generation Node B ("gNB"), New Data Indicator ("NDI"), Non-Orthogonal Multiple Access ("NOMA"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Resource Control ("RRC"), Random Access Procedure ("RACH"), Random Access Response ("RAR"), Radio Network Temporary Identifier ("RNTI"), Reference Signal ("RS"), Remaining Minimum System Information ("RMSI"), Resource Block Assignment ("RBA"), Resource Spread Multiple Access ("RSMA"), Round Trip Time ("RTT"), Receive ("RX"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Signal-to-Interference-Plus-Noise Ratio ("SINR"), System Information Block ("SIB"), Synchronization Signal ("SS"), Transport Block ("TB"), Transport Block Size ("TBS"), Time-Division Duplex ("TDD"), Time Division Multiplex ("TDM"), Time Division Orthogonal Cover Code ("TD-OCC"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NACK"). ACK means that a TB is correctly received while NACK (or NAK) means a TB is erroneously received.

In certain wireless communications networks, a UE operating in a mobile communication network requires a change to different system, such as different network core (e.g., system generation) and/or radio access technology in order to receive the service in the mobile communication network. Fallback procedures are commonly used to allow interoperability of various services used by the remote unit 105, conventional fallback procedures involve the switch from a packet-switched domain ("PS-domain") to a circuit-switched domain ("CS-domain"). Moreover, conventional fallback procedures failed to inform the RAN and UE of target systems and RATS, thereby leading to situations where the UE may connect to the wrong system during the fallback procedure.

BRIEF SUMMARY

Methods for providing fallback assistance information to a RAN node are disclosed. Apparatuses and systems also perform the functions of the methods.

One method (e.g., of a UE) for providing fallback assistance information to a RAN node includes sending a service request, wherein the service request requires fallback to at least one of: a different RAT and a different CN. The method includes receiving, at the remote unit, a connection release message, where the connection release message includes redirection information for the service fallback, the redirection information including a target CN. The method includes selecting a NAS procedure based on the target CN and connecting to the target CN using the selected NAS procedure.

Another method (e.g., of a RAN node) for providing fallback assistance information includes receiving a first message from a network function in a first core network, wherein the first message indicates service fallback of a remote unit connected to the RAN node and indicates a target CN. The method includes creating service fallback parameters for the remote unit. The method includes sending a connection release message to the remote unit, where the connection release message includes redirection information for the service fallback, the redirection information including the target CN Another method (e.g., of an AMF in a first core network) for providing fallback assistance information includes receiving a service request from a remote unit, wherein the service request is for a service which requires fallback to at least one of: a different RAT and a different CN. The method includes identifying, at the network function, at least one of: a target RAT and a target CN, based on at least one of: the requested service, remote unit capabilities and network configuration. The method includes indicating, to a RAN node, the at least one of: a target RAT and a target CN, based on the requested service, wherein the RAN node performs fallback with the remote unit based on the at least one of: a target RAT and a target CN.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 4 is a diagram illustrating one embodiment of a connection release message that may be used for providing fallback assistance information to a RAN node;

DETAILED DESCRIPTION

Figure 1:
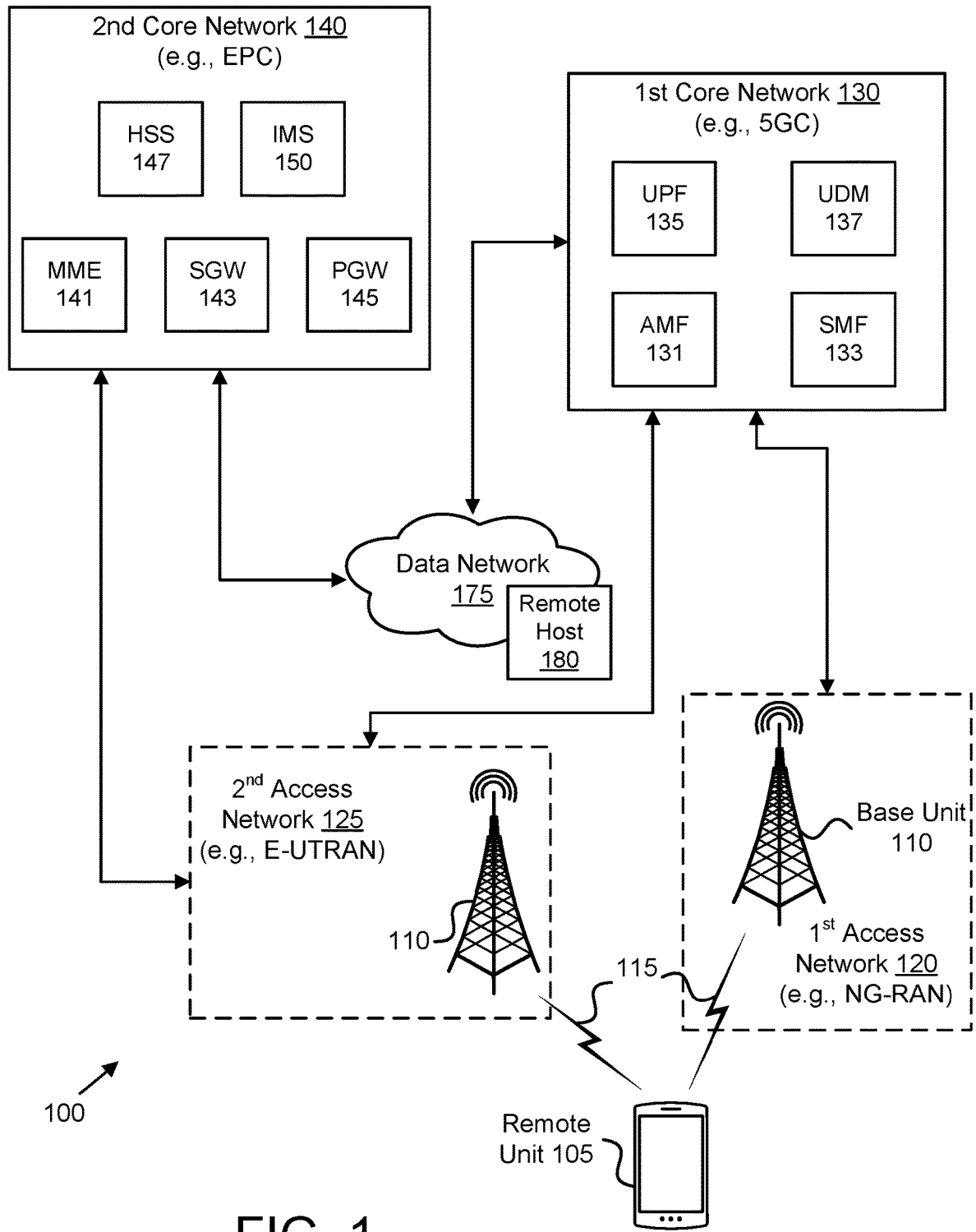
FIG. 1 is a schematic block diagram illustrating one embodiment of a wireless communication system for providing fallback assistance information to a RAN node.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Disclosed herein are methods for service fallback procedure including the steps of: the CN providing fallback assistance information to the RAN node (e.g., a gNB), and the RAN node deciding about (1) the mobility mechanism (IDLE or CONNECTED mode mobility) and (2) the target RAT, and if needed, target CN for the fallback procedure. Here, the fallback assistance information may include type of mobility (e.g., whether CONNECTED mode or IDLE mode mobility is preferred based on the configuration in the CN) and/or target core network(s) and/or Criticality requirements. Note that if the RAN node performs IDLE state mobility, then the UE considers the indicated target core network when initiating NAS procedure in the target cell. In various embodiments, the NAS procedure in the target CN may either 1) implicit include also a request for the particular service; or 2) be an independent NAS procedure for the requested service.

In one example, the UE has a pending IMS emergency session request (e.g., voice) from the upper layers. If the AMF has indicated support for emergency services using fallback via the Registration Accept message for the current RAT, then the UE sends a Service Request message indicating that it requires emergency services fallback.

After receiving the Service Request for Emergency Fallback, the AMF triggers N2 procedure resulting in either CONNECTED state mobility (Handover procedure) or IDLE state mobility (redirection) to either E-UTRA/5GC or to E-UTRAN/EPC depending on factors such as N26 availability, network configuration and radio conditions. Here, the 5GC triggers a request for Emergency Services Fallback by executing an NG-AP procedure in which it indicates to NG-RAN that this is a fallback for emergency services. In the N2 procedure, the AMF, based on the support of Emergency Services in EPC or 5GC, may indicate the target CN for the RAN node to know whether inter-RAT fallback or inter-system fallback is to be performed. The target CN indicated in the N2 procedure is also conveyed to the UE in order to be able to perform the appropriate NAS procedures (S1 or N1 Mode). When AMF initiates Redirection for UE(s) that have been successfully authenticated, AMF includes the security context in the request to trigger fallback towards NG-RAN.

Based on the target CN indicated in the N2 request for Emergency Fallback, one of the following procedures is executed by NG-RAN: (1) if UE is currently camped on NR, then the NG-RAN performs fallback (e.g., initiates handover or redirection) to a 5GC-connected E-UTRAN cell; or (2) the NG-RAN initiates handover or redirection to E-UTRAN connected to EPS. Here, the NG-RAN uses the security context provided by the AMF to secure the redirection procedure. One example of performing fallback includes the NG-RAN initiating handover or redirection to E-UTRAN.

Note that if the redirection procedure is used, then the target CN is also conveyed to the UE in order to be able to perform the appropriate NAS procedures (S1 or N1 Mode). After handover to the target cell the UE establishes a PDU Session/PDN connection for IMS emergency services and performs the IMS procedures for establishment of an IMS emergency session (e.g., voice).

FIG. 1 depicts an embodiment of a wireless communication system 100 for providing fallback assistance information to a RAN node. In one embodiment, the wireless communication system 100 includes at least one remote unit 105, a first access network 120 containing at least one base unit 110, a second access network 125 containing at least one base unit 110, wireless communication links 115 between remote unit 105 and base unit 110, a first core network 130, and a second core network 140. Even though a specific number of remote units 105, access networks 120, 125, base units 110, wireless communication links 115, and core networks 130, 140 are depicted in FIG. 1, one of skill in the art will recognize that any number of remote units 105, access networks 120, 125, base units 110, wireless communication links 115, and core networks 130, 140 may be included in the wireless communication system 100. In various embodiments, the access networks 120, 125 may contain one or more WLAN (e.g., Wi-Fi™) access points ("APs"). Here, the first access network 120, second access network 125, first core network 130 and second core network 140 belong to the same mobile communication network (e.g., the same PLMN).

In one implementation, the wireless communication system 100 is compliant with the 5G system and the LTE system specified in the 3GPP specifications. More generally, however, the wireless communication system 100 may implement some other open or proprietary communication network, for example, WiMAX, among other networks. The present disclosure is not intended to be limited to the implementation of any particular wireless communication system architectures or protocols.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as subscriber units, mobiles, mobile stations, users, terminals, mobile terminals, fixed terminals, subscriber stations, UEs, user terminals, a device, or by other terminology used in the art. The remote units 105 may communicate directly with one or more of the base units 110 via uplink ("UL") and downlink ("DL") communication signals. Furthermore, the UL and DL communication signals may be carried over the wireless communication links 115.

In some embodiments, the remote units 105 communicate with a remote host 180 (for example, an application server) via a data path that passes through one of the core networks 130 and 140 and also passes through the data network 175. For example, a remote unit 105 may establish a PDU session (or similar data connection) to the data network 175 via the first core network 130. The first core network 130 then relays traffic between the remote unit 105 and the remote host 180 using the PDU session. As another example, a remote unit 105 may establish a PDN connection to the data network 175 via the second core network 140. The second core network 140 then relays traffic between the remote unit 105 and the remote host 180 using the PDN connection.

The base units 110 may be distributed over a geographic region. In certain embodiments, a base unit 110 may also be referred to as an access terminal, an access point, a base, a base station, a Node-B, an eNB, a gNB, a Home Node-B, a relay node, a device, or by any other terminology used in the art. The base units 110 are generally part of a radio access network ("RAN"), such as the first access network 120 (e.g., NG-RAN) and/or the second access network 125 (e.g., E-UTRAN), that may include one or more controllers communicably coupled to one or more corresponding base units 110. These and other elements of the radio access network are not illustrated, but are well known generally by those having ordinary skill in the art.

The base units 110 may serve a number of remote units 105 within a serving area, for example, a cell or a cell sector via a wireless communication link 115. The base units 110 may communicate directly with one or more of the remote units 105 via communication signals. Generally, the base units 110 transmit downlink ("DL") communication signals to serve the remote units 105 in the time, frequency, and/or spatial domain. Furthermore, the DL communication signals may be carried over the wireless communication links 115. The wireless communication links 115 may be any suitable carrier in licensed or unlicensed radio spectrum. The wireless communication links 115 facilitate communication between one or more of the remote units 105 and/or one or more of the base units 110.

As depicted, the wireless communication system 100 includes both a first core network 130 and a second core network 140. Here, the first core network 130 and second core network 140 are part of the same PLMN. Each of the first core network 130 and second core network 140 is associated with a different "system generation" of the mobile communication network. Moreover, some services are available in the first core network 130 that are not available in the second core network 140, and vice versa. Accordingly, in some situations the remote unit 105 may need to fallback from the first core network 130 to the second core network 140 in order to access certain services.

The first core network 130 includes an Access and Mobility Management Function ("AMF") 131, a SMF 133, a UPF 135, and a UDM 137. Additionally, the second core network 140 includes a Mobility Management Entity ("MME") 141, a Serving Gateway ("SGW") 143, a Packet Gateway ("PGW") 145, and a Home Subscriber Server ("HSS") 147. In some embodiments, the UDM 137 and HSS 147 may be co-located and/or may be a single entity shared by the first core network 130 and second core network 140. Although specific numbers and types of network functions are depicted in FIG. 1, one of skill in the art will recognize that any number and type of network functions may be included in the mobile core networks 130 and 140. While the second core network 140 is depicted as including an IP multimedia subsystem ("IMS") 150, in other embodiments, the IMS 150 may be separate from the second core network 140.

In one embodiment, the first core network 130 is a fifth-generation core network ("5GC"). Such a first core network 130 may be accessed using the New Radio ("NR") Radio Access Technology ("RAT") or the LTE RAT. In one embodiment, the second core network 140 is an Evolved Packet Core ("EPC") or similar fourth-generation core network. Such a second core network 140 may be accessed using the LTE RAT. In another embodiment, the second core network 140 is a UMTS core network or similar third-generation core network. Such a core network 140 may be accessed using the LTE RAT or the UTRA RAT.

While fallback procedures are commonly used to allow interoperability of various services used by the remote unit 105, conventional fallback procedures involve the switch from a packet-switched domain ("PS-domain") to a circuit-switched domain ("CS-domain"). In some embodiments, a fallback procedure may involve a handover of one or more packet-switched sessions ("PS-sessions"). In other embodiments, the fallback procedure does not handover the PS-sessions.

In mobile communication networks having a fifth-generation core network ("5GC") and supporting a fifth-generation radio access technology, there are many possible scenarios for mobility of a remote unit 105 between various radio access technologies and/or core networks. For example, the remote unit may switch from the 5GC via NR RAT to 5GC via LTE RAT, referred to as RAT fallback. In another example, the remote unit 105 may switch from the 5GC via LTE RAT to 5GC via NR RAT, referred to as inter-RAT handover. In a third example, the remote unit 105 may switch from the 5GC via LTE RAT to an EPC via LTE RAT, referred to as a system (or CN) fallback. In a fourth example, the remote unit 105 may switch from the 5GC via NR RAT to an EPC via LTE RAT, also referred to as a system (or CN) fallback. In a fifth example, the remote unit 105 may switch from the 5GC via NR RAT to UMTS via UTRA, also referred to as a system fallback. Procedures for facilitating RAT and/or CN mobility are described below with reference to FIG. 3A-3B.

Previously, the fallback procedure is used to transfer the remote unit 105 from 4G (EPS) to CS domain. However, when considering 5G system, fallback is possible for PS services as well, i.e., the fallback is from PS domain to PS domain. However, when following conventional fallback procedures, the RAN node (e.g., base unit 110) does not have available information to steer the remote unit 105 to the appropriate target RAT or target system (CN).

The RRC Release procedure with redirect indication as known from LTE specification (e.g., TS 23.272) is used to indicate to the remote unit 105 the information like frequency to measure, Location Area ID (LAI), etc. However, in the 5G scenarios this information may not be sufficient in order to steer the remote unit 105 to the appropriate target RAT or target system (CN). Moreover, it is important for the remote unit 105 to differentiate which target CN will be used, especially in cases of RAT fallback and inter-RAT handover, in order to initiate the correct NAS procedure in the target RAT.

To overcome the above described limitations of conventional fallback procedures, the system 100 implements a new procedure which provides core network (CN) assisted information to the RAN node (e.g., gNB, or base unit 110) to allow the RAN node to take appropriate decision about (1) the mobility mechanism (IDLE or CONNECTED mode mobility) and (2) the target RAT. In some embodiments, the CN assisted information also includes the target CN for the fallback, if needed.

In particular, the first core network 130 (e.g., the AMF 131) provides supported 'type of mobility' and target CN (the latter in case when the target RAT is E-UTRAN). In various embodiments, the target CN type is also provided to the remote unit 105 (e.g., via RRC signaling). In one alternative, the RAN node passes along the target CN information to the UE. In another alternative, the target CN type may be provided from the AMF 131 to the remote unit 105 directly using NAS signaling.

In some embodiments, when requesting a service for a possible RAT/system fallback (e.g., emergency services), the remote unit 105 may additionally indicate to the first core network 130 (e.g., to the AMF 131 in a NAS Service Request message) whether the remote unit 105 uses SR-mode or DR-mode of operation.

Based on 1) request from the remote unit 105 (e.g., the NAS Service Request message) and/or 2) based on network configuration (e.g., whether the N26 interface for 5GC/EPC interworking is deployed), and/or 3) based on the service priority/latency requirements, the AMF 131 determines whether CONNECTED mode mobility (e.g., handover) or whether IDLE mode mobility (e.g., RRC Release with redirection) is desirable.

As used herein, "IDLE mode mobility" refers to RRC Release procedure with a redirect IE. The IDLE mode mobility may be inter-RAT IDLE mobility (e.g., within the same CN), or inter-system IDLE mobility (e.g., changing CNs). Also, as used herein, term "CONNECTED mode mobility" is used to represent Handover procedure (e.g., Xn-based or N2-based or S1-based, etc.) which may be inter-RAT Handover (e.g., within the same CN), or inter-system Handover (e.g., changing CNs).

In response to determining the mobility mode, the AMF 131 indicates in the N2 signaling message to the RAN node (e.g., the base unit 110) at least the following: target CNs (or a list of target CNs, including priorities), whether HO or IDLE mode mobility to be used, and optionally target RATs (e.g., a list, including priorities for different RATs).

The base unit 110 transmits the target CNs (or a list of target CNs, including priorities) to the remote unit 105. In an alternate embodiment, the AMF 131 may indicate to the remote unit 105 the target CNs in a NAS Service Accept message to the remote unit 105.

The RAN node (e.g., base unit 110) makes the final decision about the target RAT of the fallback procedure considering the radio topology, radio conditions of the remote unit 105, and the indications received from the CN (e.g., from AMF 131).

The RAN node (e.g., base unit 110) needs to indicate to the remote unit 105 in the RRC release message with redirection IE the target RAT and the target CN when it decides that the radio handover is not to be performed since it cannot be performed (e.g., when there is no handover preparation with the target cell possible) or when it is inefficient (will take longer time than acceptable for some latency critical services). It should be noted that in some cases an RRC connection release with redirection may be faster than a handover procedure, especially if the redirection can be triggered blindly i.e. based on coverage information rather than the UE measurement reports.

Based on the information received by the remote unit 105 (e.g., information like target CN type and/or target RAT cell identifier, frequency etc. either in NAS message or in RRC message) the remote unit 105 initiates NAS procedure using the NAS protocol according to the target CN indication and initiates the Access Stratum procedure to accomplish the radio mobility in the target cell.

Figure 2:
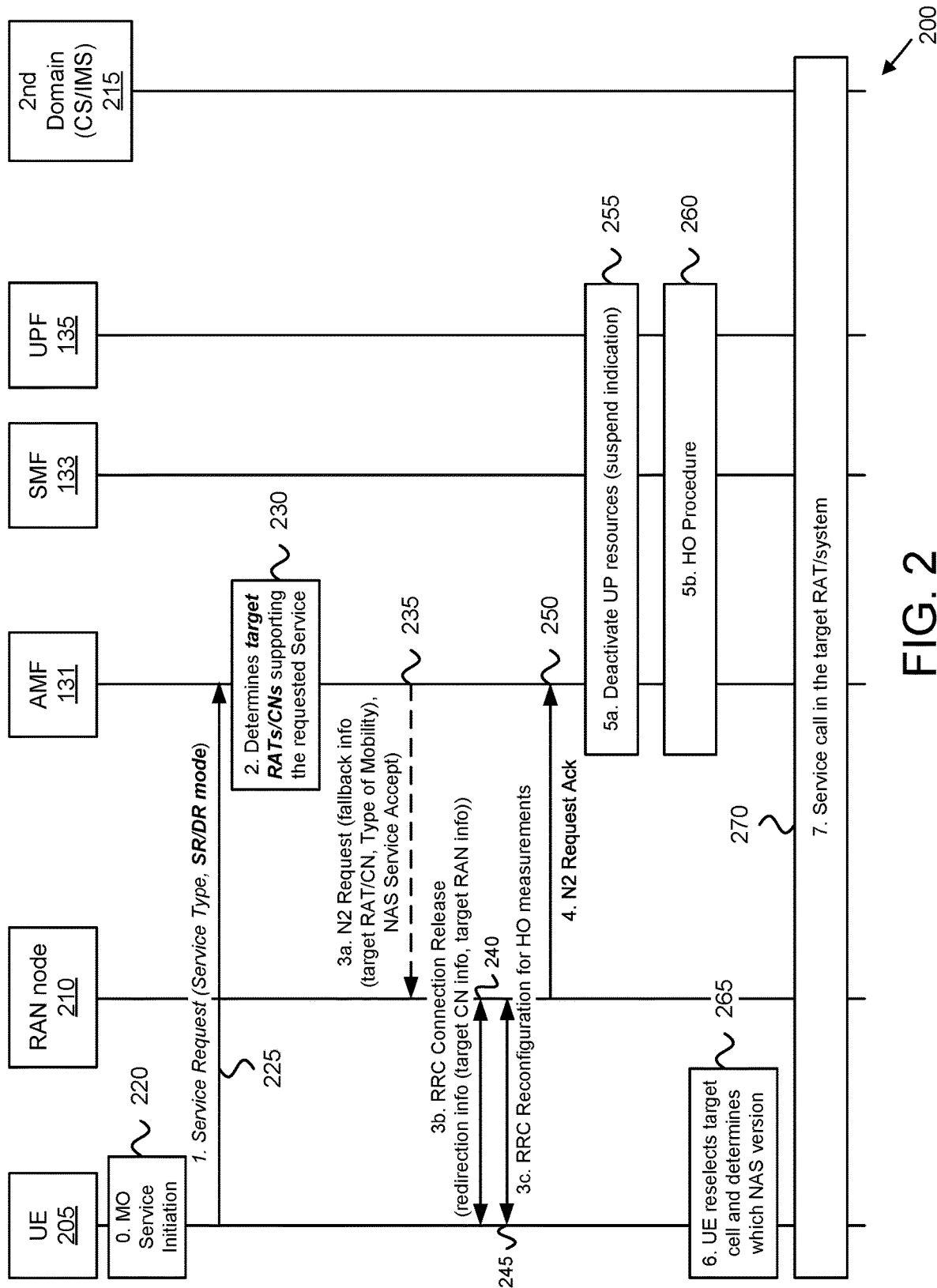
FIG. 2 is a block diagram illustrating one embodiment of a procedure for providing fallback assistance information to a RAN node.

FIG. 2 depicts a first fallback procedure 200, according to embodiments of the disclosure. The first fallback procedure 200 involves a UE 205, a RAN node 210, the AMF 131, the SMF 133, the UPF 135, and a second domain 215 of the PLMN. Here, the UE 205 falls back to the second domain 215. In one embodiment, the second domain includes an IMS. In another embodiment, the second domain includes a circuit-switched network. The second domain 215 is located in a different core network than the AMF 131, SMF 133, and UPF 135 (though located in the same PLMN).

A key aspects of the first fallback procedure 200 is that the serving core network (e.g., containing the AMF 131) provides assistance information to the RAN node 210 to allow the RAN NODE 210 to make the appropriate decision about the mobility mechanism (e.g., idle mode mobility vs connected mode mobility) and the target radio access technology ("RAT") for the fallback procedure. The assistance information includes a target CN and, optionally, target cell information indicating at least one RAT. Target cell information may include frequency band, RAT, and the like.

The UE 205 may be one embodiment of the remote unit 105, discussed above. The RAN node 210 may be one embodiment of the base unit 110, discussed above. In some embodiments, the RAN node 210 is a gNB or an eNB. The second domain 215 may be one embodiment of the second core network 140 and/or IMS 150.

The first fallback procedure 200 begins at Step 0, where UE 205 determines to initiate a service (MO Service Initiation) (see block 220). In one embodiment, the service to initiate is an emergency service.

In Step 1, the UE 205 sends NAS Service Request to the AMF 131 (see messaging 225). The UE 205 includes in the NAS message at least the following information: UE ID, requested type of service (e.g., Emergency, Voice, Voice over PS (e.g., Voice over IMS) or Voice over CS), request for fallback/move to another target system. In certain embodiments, the NAS Service Request message also indicates SR/DR-mode of operation of the UE 205.

Optionally, the UE 205 may indicate radio capability to the AMF 131, e.g., whether the UE 205 is single transmission capable, or dual transmission capable. Based on this UE 205 radio capability, the AMF 131 determines whether a CONNECTED mode (e.g., Handover procedure) or IDLE mode mobility (e.g., RRC Release with redirection) is desirable. Note that the term IDLE mode mobility is used to represent RRC Release procedure with redirect IE.

The 'request for fallback/move to another target system' may for example indicate to the network (e.g., AMF 131 or SMF 133) which would be the target system, e.g., EPS (if the UE 205 is currently connected to 5GS) or 5GS (if the UE 205 is currently connected to EPS).

In Step 2, the AMF 131 may determine the target RAT(s) (e.g., E-UTRAN, UTRAN, GERAN) and target CN(s) (e.g., in case of target RAT is E-UTRAN the target CN may be EPC or 5GC) which would support the requested service (see block 230). In addition, the AMF 131 considers the network deployment (e.g., whether N26 interface is supported) in order to determine whether CONNECTED mode mobility can be supported, or whether IDLE mode mobility is preferable. The AMF 131 indicates this information to the RAN node 210 as "type of mobility" indication. For example, if fallback to EPC is required and N26 interface is supported, then CONNECTED mode mobility is preferable. However, if fallback to EPC is required and N26 is not supported, then AMF 131 may indicate that IDLE mode mobility is preferable.

In one embodiment, the target CN is indicated to RAN node 210 or UE 205 only if there may be ambiguity at the UE 205. For example, if the target RAT may be connected to multiple CNs, then the target CN is indicated to the RAN/UE. In a particular example, if the target RAT is E-UTRAN (or known as LTE) and LTE cell is connected to both EPC and 5GC, then redirecting the UE 205 in IDLE state to the LTE cell would cause ambiguity. One proposal is that the AMF 131 decide to indicate target CN type to RAN node 210 or UE 205 (in step 3 below) only if there is ambiguity of the CN to be used. In another example, if the target RAT is UTRAN (e.g., 3G), then there is no ambiguity for the target CN, as the CN type is GPRS.

As the AMF 131 usually does not know the exact coverage conditions of the potential target RAT(s), the AMF 131 may create a list of target RATs/CNs based on preference or order of selection. This kind of preference list would steer the RAN node 210 (e.g., gNB) to take decision about the target RAT based on the coverage condition at the UE 205 location (e.g., depending on the radio measurements reported by the UE 205 to the source RAN node 210).

Further, if the UE 205 is in CONNECTED state, the AMF 131 may consider the service priority/latency requirements of the PDU Session used by the UE 205 when creating the fallback information to be sent to the RAN node 210. Based on this, the AMF 131 may send to the RAN node 210 information about the criticality (e.g., priority or latency requirements) of the fallback procedure. For example, if the UE 205 is using a PDU Session (e.g., the UE 205 resources are activated) having a packet delivery requirement for latency, the AMF 131 may indicate to the RAN node 210 that the mobility procedure shall meet the latency/priority requirements.

In Step 3a, the AMF 131 sends N2 request signaling message to the RAN node 210 (e.g., gNB) to request a fallback procedure for the UE 205. The AMF 131 indicates in addition at least one target CN type to which the UE 205 has to fallback. The RAN node 210 takes the target CN information in order to select to the correct cell to which IDLE mode or CONNECTED mode procedure needs to be performed. The AMF 131 may indicate at least one of the following fallback information to the RAN node 210: Target RATs, Target Tracking Area (TA), Requested service, Type of mobility, and/or Criticality requirements.

As used herein, the "Target RATs" refers to an indication of at least one RAT to which the UE 205 has to be moved in order to perform the requested service. "Target Tracking Area (TA)" refers to information helps the RAN node 210 to find proper target cell as part of the TA indicated by the CN. The "Requested service" refers to the service which the UE 205 would like to use the and which triggered the procedure for fallback or RAT/System change. The "Type of mobility" refers to an indication of whether CONNECTED mode or IDLE mode mobility is preferred based on the configuration in the CN. For example, if N26 interface is deployed, the AMF 131 may indicate CONNECTED state mobility is desirable and the AMF 131 based on this may include the AS context (e.g., AS security, MM context, radio capabilities, etc.) to the gNB. If, e.g., the N26 interface is not deployed, the CN may indicate 'IDLE mode mobility' or 'similarly RRC Release with redirect' or similar indication. "Criticality requirements" refers to an indication of the service priority/latency requirements of the PDU Session currently used by the UE 205.

The RAN node 210 decides whether to perform IDLE mode mobility (e.g., to execute RRC release procedure with redirection IE) or to perform CONNECTED mode mobility (e.g., to execute a Handover procedure) based on the UE 205's radio coverage and on the indications received from the AMF 131.

Step 3b shows the case where the RAN node 210 decides to perform IDLE mode mobility, the RAN node 210 performs RRC release procedure and sends an RRC Connection Release message to the UE 205 which includes target CN information (see messaging 235). In one embodiment, the RRC Connection Release message includes redirection information, the redirection information including the target CN information and, optionally, target RAN information.

Alternatively, the RAN node 210 initiates handover procedure to the target RAT/CN, when this is possible, with or without configuring measurements to the UE 205. The latter case is Blind handover case. In the former case, the actual handover execution shall be delayed until the UE 205 performs measurements and provides the results to source RAT, the source RAT in turn prepares/informs the target RAT for the same, the target RAT prepared handover command and sends to the UE 205 via the source RAT.

Step 3c shows the case where the RAN node 210 decides to perform CONNECTED mode mobility, the RAN node 210 may perform RRC Connection Reconfiguration procedure in order to configure the UE 205 with measurements to the desired target cell (see messaging 240). In the following a RAN node 210 initiates a Handover procedure to the target RAT cell.

In Step 4, the RAN node 210 sends N2 request Ack message to the AMF 131 (see messaging 245). If the RAN node 210 has decided to perform IDLE mode mobility, the RAN node 210 includes corresponding information to the AMF 131 indicating that the UE 205 has been redirected to a particular RAT. However, if the RAN node 210 has decided to perform CONNECTED mode mobility, the RAN node 210 performs actions according to Xn-based or N2-based Handover procedures.

Based on whether the RAN node 210 selects IDLE mode mobility or CONNECTED mode mobility, the RAN 210 performs one of the following:

Step 5a: If the RAN node 210 has performed IDLE mode mobility, the AMF 131 determines whether to release the existing PDU Sessions, or to preserve the PDU Session context in the CN but deactivate the UP resources (in case the UE 205 has been in CONNECTED state and the UP resources have been activated; see block 250). For example, the AMF 131 may initiate N11 exchange towards the SMF 133 to release the PDU Session UP resources. If the AMF 131 decides to preserve the PDU Sessions context in the 5GC, the AMF 131 may also indicate to the SMF 133 that the PDU Session is temporary suspended in order to avoid the SMF 133 initiating paging procedure.

Step 5b: If the RAN node 210 has performed CONNECTED mode mobility (e.g., a Handover procedure), then the AMF 131 continues with the Handover procedure (see block 255).

In Step 6, the UE 205 initiates NAS procedure in the target RAT using the NAS protocol according to the target CN indication (e.g., EPC NAS or 5GC NAS) received in the RRC message (see block 260). In certain embodiments, the RRC message may indicate to the UE 205 that the redirection may be performed to a particular CN Type (e.g., 5GS or EPS) and in the target RAT cell. In such embodiments, the UE 205 uses the corresponding NAS protocol accordingly.

Moreover, subsequent to the radio procedure to move the UE 205 in the target RAT cell using, e.g., RRC Idle or RRC INACTIVE state cell redirection principles, the NAS protocol corresponding to the indicated CN Type shall be used. An ASN.1 encoding of including the CN Type (e.g., 5GS or EPS) in the RRC message releasing the RRC Connection is shown FIG. 4.

In Step 7, the UE 205 imitates a service call in the target RAT and/or target CN ("target system"), depicted here as the second domain 215 (see block 265). If IDLE mode mobility was performed and after the UE 205 completes the RRC procedure establishment in the target cell and performs NAS registration (or attach) with the target CN, the UE 205 initiates the requested service (see block 270). Alternatively, the requested service may be also indicated during the NAS registration (or attach) procedure. The first fallback procedure 200 ends.

Figure 3:
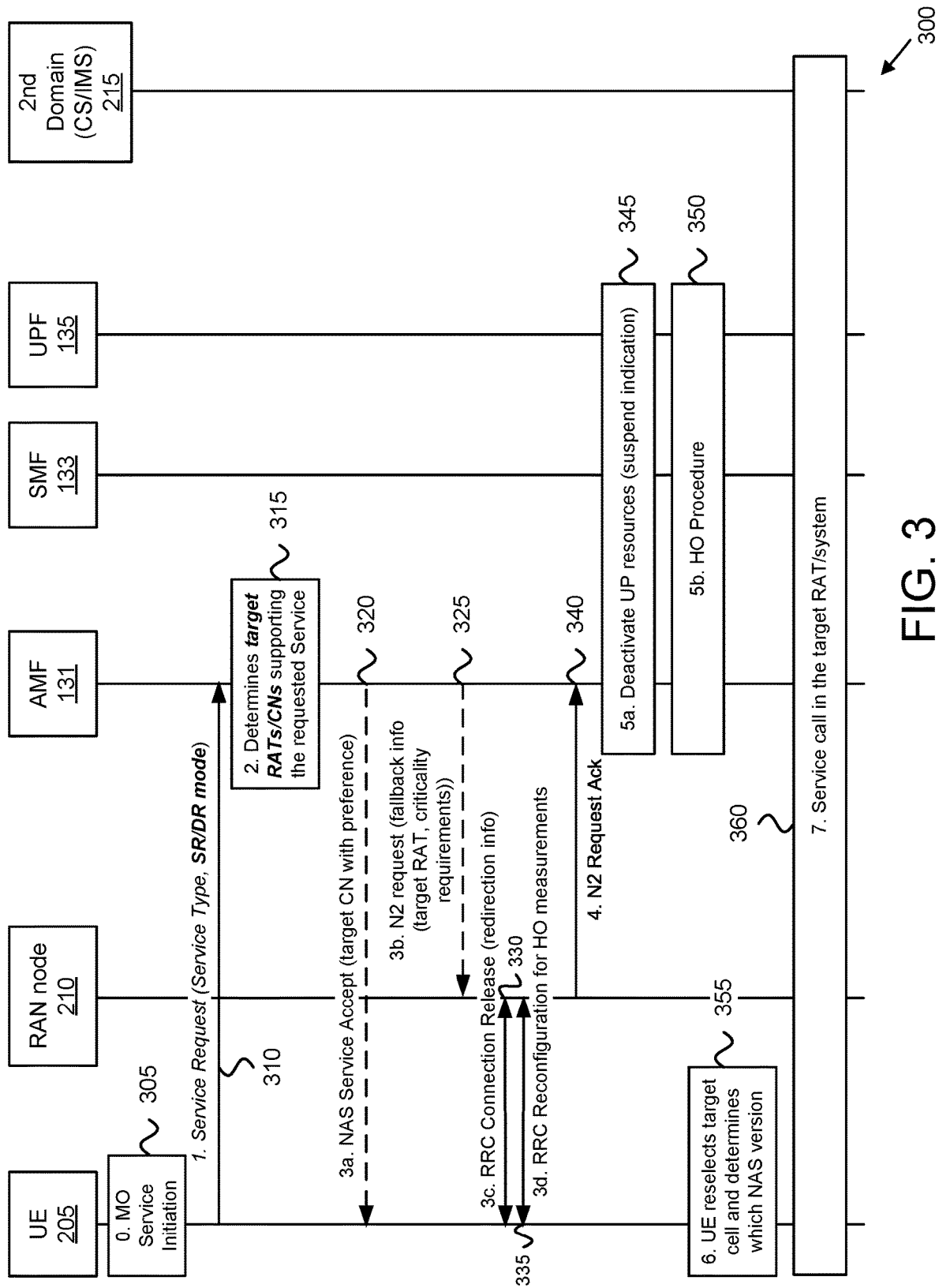
FIG. 3 is a block diagram illustrating another procedure for providing fallback assistance information to a RAN node.

FIG. 3 depicts a second fallback procedure 300, according to embodiments of the disclosure. The second fallback procedure 300 involves the UE 205, the RAN node 210, the AMF 131, the SMF 133, the UPF 135, and the second domain 215 of the PLMN. Here, the UE 205 falls back to the second domain 215.

A key aspects of the second fallback procedure 300 is that the serving core network (e.g., containing the AMF 131) provides assistance information to the RAN node 210 to allow the RAN NODE 210 to make the appropriate decision about the mobility mechanism (e.g., idle mode mobility vs connected mode mobility) and the target radio access technology ("RAT") for the fallback procedure. The assistance information includes a target CN and, optionally, target cell information indicating at least one RAT. Target cell information may include frequency band, RAT, and the like.

The second fallback procedure 300 begins at Step 0, where UE 205 determines to initiate a service (MO Service Initiation) (see block 305). In one embodiment, the service to initiate is an emergency service.

In Step 1, the UE 205 sends NAS Service Request to the AMF 131 (see messaging 310). The UE 205 includes in the NAS message at least the following information: UE ID, requested type of service (e.g., Emergency, Voice, Voice over PS (e.g., Voice over IMS) or Voice over CS), request for fallback/move to another target system. In certain embodiments, the NAS Service Request message also indicates a SR/DR-mode of operation of the UE 205.

Optionally, the UE 205 may indicate radio capability to the AMF 131, e.g., whether the UE 205 is single transmission capable, or dual transmission capable. Based on this UE 205 radio capability, the AMF 131 may determine whether a CONNECTED mode (e.g., Handover procedure) or IDLE mode mobility (e.g., RRC Release with redirection) is desirable. Note that the term IDLE mode mobility is used to represent RRC Release procedure with redirect IE.

The 'request for fallback/move to another target system' may indicate to the network (e.g., AMF 131 or SMF 133) which would be the target system, e.g., EPS (if the UE 205 is currently connected to 5GS) or 5GS (if the UE 205 is currently connected to EPS).

In Step 2, the AMF 131 may determine the target RAT(s) (e.g., E-UTRAN, UTRAN, GERAN) and target CN(s) (e.g., in case of target RAT is E-UTRAN the target CN may be EPC or 5GC) which would support the requested service (see block 315). In addition, the AMF 131 considers the network deployment (e.g., whether N26 interface is supported) in order to determine whether CONNECTED mode mobility can be supported, or whether IDLE mode mobility is preferable. The AMF 131 indicates this information to the RAN node 210 as "type of mobility" indication. For example, if fallback to EPC is required and N26 interface is supported, then CONNECTED mode mobility is preferable. However, if fallback to EPC is required and N26 is not supported, then AMF 131 may indicate that IDLE mode mobility is preferable.

In Step 3a, the AMF 131 sends a NAS Service Request message to the UE 205 containing a proper reject cause value (see messaging 320). For example, the reject cause may indicate that the requested service is not supported. The AMF 131 may also indicate a list of possible RATs/CNs in which the requested service may be used. If the AMF 131 has detected that the target RAT may be connected to multiple CNs (e.g., in case of E-UTRA), the AMF 131 may include a target CN indication to the UE 205. The target CN points to the UE 205 which NAS protocols stack to be used after the fallback procedure.

In Step 3b, the AMF 131 sends a N2 request signaling message to the RAN node 210 (e.g., gNB) to request a fallback procedure for the UE 205 (see messaging 325). The AMF 131 may indicate at least one of the following fallback information to the RAN node 210: Target RATs, Target Tracking Area (TA), Requested service, Type of mobility, and/or Criticality requirements. Note that the NAS Service Request message from Step 3a may be sent encapsulated in the same N2 message as Step 3b. The RAN node 210 should correspondingly process and transfer first the encapsulated NAS message to the UE 205 before releasing the RRC connection.

The RAN node 210 decides whether to perform IDLE mode mobility (e.g., to execute RRC release procedure with redirection IE) or to perform CONNECTED mode mobility (e.g., to execute a Handover procedure) based on the UE 205's radio coverage and on the indications received from the AMF 131.

Step 3c shows the case where the RAN node 210 decides to perform IDLE mode mobility, the RAN node 210 performs RRC release procedure (see messaging 330). Alternatively, the RAN node 210 initiates handover procedure to the target RAT/CN, when this is possible, with or without configuring measurements to the UE 205. The latter case is Blind handover case. In the former case, the actual handover execution shall be delayed until the UE 205 performs measurements and provides the results to source RAT, the source RAT in turn prepares/informs the target RAT for the same, the target RAT prepared handover command and sends to the UE 205 via the source RAT.

Step 3d shows the case where the RAN node 210 decides to perform CONNECTED mode mobility, the RAN node 210 may perform RRC Connection Reconfiguration procedure in order to configure the UE 205 with measurements to the desired target cell (see messaging 335). In the following a RAN node 210 initiates a Handover procedure to the target RAT cell.

In Step 4, the RAN node 210 sends N2 request Ack message to the AMF 131 (see messaging 340). If the RAN node 210 has decided to perform IDLE mode mobility, the RAN node 210 includes corresponding information to the AMF 131 indicating that the UE 205 has been redirected to a particular RAT. However, if the RAN node 210 has decided to perform CONNECTED mode mobility, the RAN node 210 performs actions according to Xn-based or N2-based Handover procedures.

Based on whether the RAN node 210 selects IDLE mode mobility or CONNECTED mode mobility, the RAN 210 performs one of the following:

Step 5a: If the RAN node 210 has performed IDLE mode mobility, the AMF 131 determines whether to release the existing PDU Sessions, or to preserve the PDU Session context in the CN but deactivate the UP resources (in case the UE 205 has been in CONNECTED state and the UP resources have been activated; see block 345). For example, the AMF 131 initiates N11 exchange towards the SMF 133 to release the PDU Session UP resources. If the AMF 131 decides to preserve the PDU Sessions context in the 5GC, the AMF 131 may also indicate to the SMF 133 that the PDU Session is temporary suspended in order to avoid the SMF 133 to initiate paging procedure.

Step 5b: If the RAN node 210 has performed CONNECTED mode mobility (e.g., a Handover procedure), the AMF 131 continues with the Handover procedure (see block 350).

In Step 6, the UE 205 initiates NAS procedure in the target RAT using the NAS protocol according to the target CN indication (e.g., EPC NAS or 5GC NAS) received in the NAS message (see block 355). In one possible option, the NAS message may indicate to the UE 205 that the redirection may be performed to a particular CN Type (e.g., 5GS or EPS) and in the target RAT cell, the UE 205 shall use the corresponding NAS protocol accordingly.

In Step 7, the UE 205 imitates a service call in the target RAT and/or target CN ("target system"), depicted here is the second domain 215 (see block 360). If IDLE mode mobility was performed and after the UE 205 completes the RRC procedure establishment in the target cell and performs NAS registration (or attach) with the target CN, the UE 205 initiates the requested service. Alternatively, the requested service may be also indicated during the NAS registration (or attach) procedure.

FIG. 4 depicts an RRC connection message 400 according to embodiments of the disclosure. Elements/parameters to communicate the CN assisted information, e.g., for use in the above described fallback procedures, are shown in bold and italics.

Figure 5:
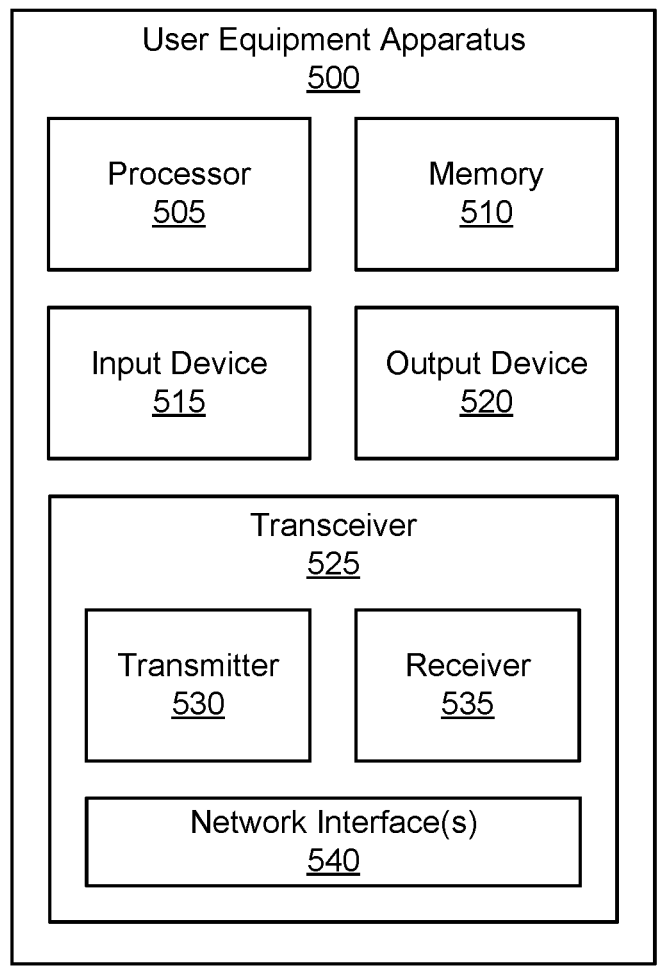
FIG. 5 is a schematic block diagram illustrating one embodiment of a user equipment apparatus that may be used for providing fallback assistance information to a RAN node.

FIG. 5 depicts one embodiment of a user equipment apparatus 500 that may be used for providing fallback assistance information to a RAN node. The user equipment apparatus 500 may be one embodiment of the remote unit 105. Furthermore, the user equipment apparatus 500 may include a processor 505, a memory 510, an input device 515, an output device 520, and a transceiver 525. In some embodiments, the input device 515 and the output device 520 are combined into a single device, such as a touchscreen. In certain embodiments, the user equipment apparatus 500 may not include any input device 515 and/or output device 520. In various embodiments, the user equipment apparatus 500 may include one or more of: the processor 505, the memory 510, and the transceiver 525, and may not include the input device 515 and/or the output device 520.

The processor 505, in one embodiment, may include any known controller capable of executing computer-readable instructions and/or capable of performing logical operations. For example, the processor 505 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 505 executes instructions stored in the memory 510 to perform the methods and routines described herein. The processor 505 is communicatively coupled to the memory 510, the input device 515, the output device 520, and the transceiver 525.

In some embodiments, the transceiver 525 sends a service request and receives a connection release message. Here, the service request requires fallback to at least one of: a different RAT and a different CN. Moreover, the connection release message includes redirection information for the service fallback, the redirection information including a target CN. The processor 505 that selects a NAS procedure based on the target CN and connects to the target CN using the selected NAS procedure.

In some embodiments, the NAS procedure in the target CN is one of: an EPC NAS procedure and a 5GC NAS procedure. In various embodiments, the NAS procedure in the target CN includes initiating the requested service via the target CN. In certain embodiments, sending the service request includes indicating at least one of: type of the requested service and a radio capability of the remote unit, the radio capability including an indication of whether the remote unit is dual-transmission capable.

In some embodiments, the redirection information further includes at least one target cell indicating at least one RAT.

In certain embodiments, the indicated RAT is E-UTRAN, wherein the processor further provides the target CN to one or more upper layers.

The memory 510, in one embodiment, is a computer readable storage medium. In some embodiments, the memory 510 includes volatile computer storage media. For example, the memory 510 may include a RAM, including dynamic RAM ("DRAM"), synchronous dynamic RAM ("SDRAM"), and/or static RAM ("SRAM"). In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media.

In some embodiments, the memory 510 stores data related to providing fallback assistance information to a RAN node. For example, the memory 510 may store target CN information, target RAT information, and the like. In certain embodiments, the memory 510 also stores program code and related data, such as an operating system or other controller algorithms operating on the remote unit 105.

The input device 515, in one embodiment, may include any known computer input device including a touch panel, a button, a keyboard, a stylus, a microphone, or the like. In some embodiments, the input device 515 may be integrated with the output device 520, for example, as a touchscreen or similar touch-sensitive display. In some embodiments, the input device 515 includes a touchscreen such that text may be input using a virtual keyboard displayed on the touchscreen and/or by handwriting on the touchscreen. In some embodiments, the input device 515 includes two or more different devices, such as a keyboard and a touch panel.

The output device 520, in one embodiment, is designed to output visual, audible, and/or haptic signals. In some embodiments, the output device 520 includes an electronically controllable display or display device capable of outputting visual data to a user. For example, the output device 520 may include, but is not limited to, an LCD display, an LED display, an OLED display, a projector, or similar display device capable of outputting images, text, or the like to a user. As another, non-limiting, example, the output device 520 may include a wearable display separate from, but communicatively coupled to, the rest of the user equipment apparatus 500, such as a smart watch, smart glasses, a heads-up display, or the like. Further, the output device 520 may be a component of a smart phone, a personal digital assistant, a television, a table computer, a notebook (laptop) computer, a personal computer, a vehicle dashboard, or the like.

In certain embodiments, the output device 520 includes one or more speakers for producing sound. For example, the output device 520 may produce an audible alert or notification (e.g., a beep or chime). In some embodiments, the output device 520 includes one or more haptic devices for producing vibrations, motion, or other haptic feedback. In some embodiments, all or portions of the output device 520 may be integrated with the input device 515. For example, the input device 515 and output device 520 may form a touchscreen or similar touch-sensitive display. In other embodiments, the output device 520 may be located near the input device 515.

The transceiver 525 includes at least transmitter 530 and at least one receiver 535. One or more transmitters 530 may be used to communicate with a RAN node, such as the base unit 110, Although only one transmitter 530 and one receiver 535 are illustrated, the user equipment apparatus 500 may have any suitable number of transmitters 530 and receivers 535. Moreover, the transceiver 525 may support one or more network interfaces 540. For example, the transceiver 525 may support a Uu interface for communication with a RAN node, an N1 interface for communication with an AMF, and the like.

Figure 6:
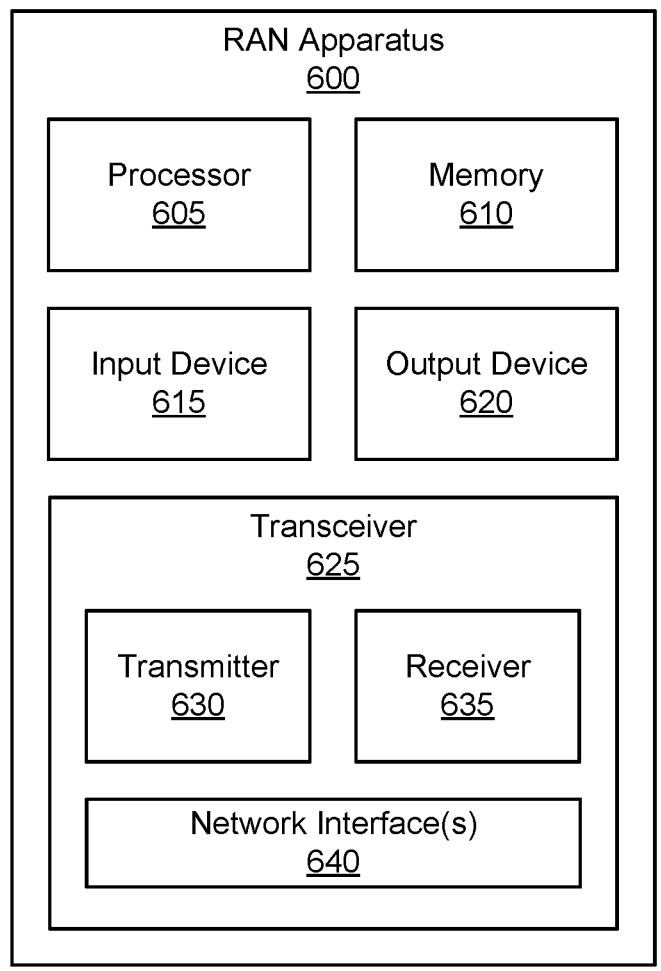
FIG. 6 is a schematic block diagram illustrating one embodiment of a RAN apparatus that may be used for providing fallback assistance information to a RAN node.

FIG. 6 depicts one embodiment of a RAN apparatus 600 that may be used for providing fallback assistance information to a RAN node. The RAN apparatus 600 may be one embodiment of the base unit 110 and/or RAN node 210. Furthermore, the RAN apparatus 600 may include a processor 605, a memory 610, an input device 615, an output device 620, and a transceiver 625. In some embodiments, the input device 615 and the output device 620 are combined into a single device, such as a touchscreen. In certain embodiments, the RAN apparatus 600 may not include any input device 615 and/or output device 620. In various embodiments, the RAN apparatus 600 may include one or more of: the processor 605, the memory 610, and the transceiver 625, and may not include the input device 615 and/or the output device 620.

The processor 605, in one embodiment, may include any known controller capable of executing computer-readable instructions and/or capable of performing logical operations. For example, the processor 605 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625.

In various embodiments, the transceiver 625 receives a first message from a network function in a first core network, wherein the first message indicates service fallback of a remote unit connected to the RAN node and indicates a target CN. The processor 605 defines and/or configures service fallback parameters for the remote unit. Moreover, the transceiver 625 sends a connection release message to the remote unit, the connection release message including redirection information for the service fallback, the redirection information including the target CN.

In some embodiments, the redirection information further includes a target radio access technology RAT. In certain embodiments, the first message additionally includes RAN node information, wherein the RAN node information comprises at least one of: UE security context and UE mobility restrictions.

In some embodiments, the first message includes a target RAT. In such embodiments, defining and/or configuring the service fallback parameters includes selecting a fallback RAT based on the target RAT and one or more of: radio topology, and radio conditions of the remote unit.

In some embodiments, the first message includes target fallback information, the target fallback information including one or more of: a target radio access technology ("RAT"), the target CN, a target mobility type, a service request by the remote unit that triggered the service fallback, and criticality requirements of a data connection of the remote unit.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media.

In some embodiments, the memory 610 stores data related to providing fallback assistance information to a RAN node. For example, the memory 610 may store target CN information, target RAT information, and the like. In certain embodiments, the memory 610 also stores program code and related data, such as an operating system or other controller algorithms operating on the remote unit 105.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, is designed to output visual, audible, and/or haptic signals. In some embodiments, the output device 620 includes an electronically controllable display or display device capable of outputting visual data to a user. For example, the output device 620 may include, but is not limited to, an LCD display, an LED display, an OLED display, a projector, or similar display device capable of outputting images, text, or the like to a user. As another, non-limiting, example, the output device 620 may include a wearable display separate from, but communicatively coupled to, the rest of the RAN apparatus 600, such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all or portions of the output device 620 may be integrated with the input device 615. For example, the input device 615 and output device 620 may form a touchscreen or similar touch-sensitive display. In other embodiments, the output device 620 may be located near the input device 615.

The transceiver 625 includes at least transmitter 630 and at least one receiver 635. One or more transmitters 630 may be used to provide DL communication signals to a remote unit 105. Similarly, one or more receivers 635 may be used to receive UL communication signals from the remote unit 105, as described herein. Although only one transmitter 630 and one receiver 635 are illustrated, the RAN apparatus 600 may have any suitable number of transmitters 630 and receivers 635. Further, the transmitter(s) 625 and the receiver(s) 630 may be any suitable type of transmitters and receivers. In one embodiment, the transceiver 625 includes transmitter/receiver pair(s) to communicate with a mobile communication network, including the first core network 130 and second core network 140. Moreover, the transceiver 625 may support one or more network interfaces 640. For example, the transceiver 625 may support a Uu interface for communication with a UE, an N2 interface for communication with an AMF, and the like.

Figure 7:
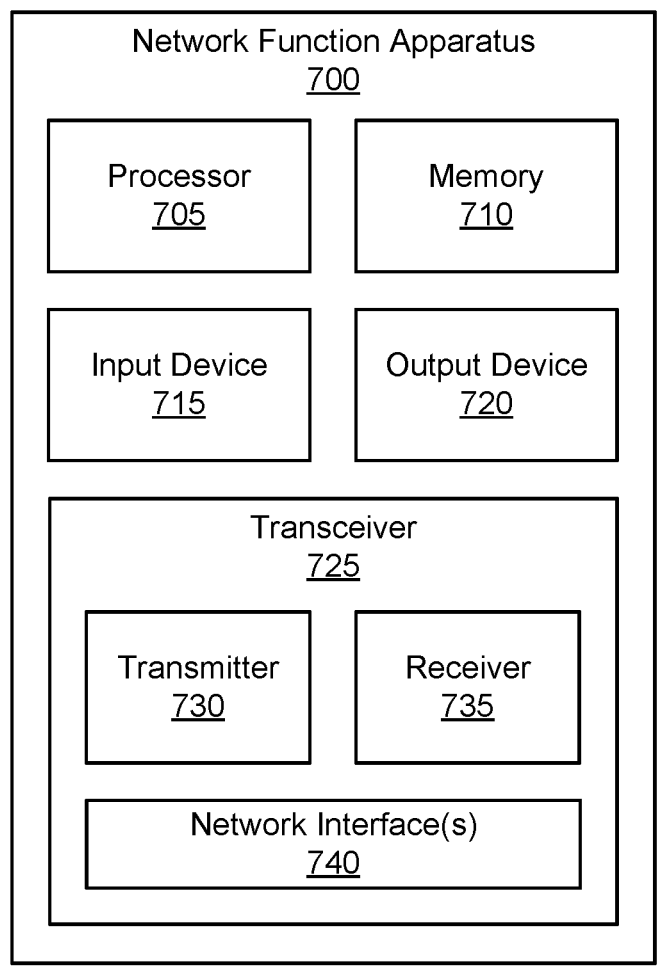
FIG. 7 is a schematic block diagram illustrating one embodiment of a network function apparatus that may be used for providing fallback assistance information to a RAN node.

FIG. 7 depicts one embodiment of a network function apparatus 700 that may be used for providing fallback assistance information to a RAN node. The network function apparatus 700 may be one embodiment of the remote unit 105. Furthermore, the network function apparatus 700 may include a processor 705, a memory 710, an input device 715, an output device 720, and a transceiver 725. In some embodiments, the input device 715 and the output device 720 are combined into a single device, such as a touchscreen. In certain embodiments, the network function apparatus 700 may not include any input device 715 and/or output device 720. In various embodiments, the network function apparatus 700 may include one or more of: the processor 705, the memory 710, and the transceiver 725, and may not include the input device 715 and/or the output device 720.

The processor 705, in one embodiment, may include any known controller capable of executing computer-readable instructions and/or capable of performing logical operations. For example, the processor 705 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 705 executes instructions stored in the memory 710 to perform the methods and routines described herein. The processor 705 is communicatively coupled to the memory 710, the input device 715, the output device 720, and the transceiver 725.

In some embodiments, the transceiver 725 receives a service request from a remote unit, wherein the service request requires fallback to at least one of: a different RAT and a different CN. The processor 705 identifies at least one of: a target RAT and a target CN, based on at least one of: the requested service, remote unit capabilities, and network configuration. Moreover, the transceiver 725 indicates, to a RAN node, the at least one of: a target RAT and a target CN, based on the requested service, wherein the RAN node performs fallback procedure with the remote unit based on the at least one of: a target RAT and a target CN. Here, performing fallback procedure includes one of:

In some embodiments, the service request indicates that the remote unit requires emergency services fallback. In certain embodiments, indicating the at least one of: a target RAT and a target CN, includes sending at least one of: a prioritized list of target RATs and a prioritized list of CNs.

In some embodiments, the transceiver 725 further sends a signaling message with fallback information to the RAN node, wherein the fallback information includes at least one of: a target RAT, a target tracking area, the request service, a mobility type, and service requirements of a data connection used by the remote unit. In such embodiments, the mobility type indicates idle mode mobility of the remote unit, the transceiver receives an acknowledgment message from the RAN node, and the processor, in response to the acknowledgment message, performs one of: releasing a data connection used by the remote unit, suspending a data connection used by the remote unit, and handing over a data connection used by the remote unit.

The memory 710, in one embodiment, is a computer readable storage medium. In some embodiments, the memory 710 includes volatile computer storage media. For example, the memory 710 may include a RAM, including dynamic RAM ("DRAM"), synchronous dynamic RAM ("SDRAM"), and/or static RAM ("SRAM"). In some embodiments, the memory 710 includes non-volatile computer storage media. For example, the memory 710 may include a hard disk drive, a flash memory, or any other suitable non-volatile computer storage device. In some embodiments, the memory 710 includes both volatile and non-volatile computer storage media.

In some embodiments, the memory 710 stores data related to providing fallback assistance information to a RAN node. For example, the memory 710 may store target CN information, target RAT information, and the like. In certain embodiments, the memory 710 also stores program code and related data, such as an operating system or other controller algorithms operating on the remote unit 105.

The input device 715, in one embodiment, may include any known computer input device including a touch panel, a button, a keyboard, a stylus, a microphone, or the like. In some embodiments, the input device 715 may be integrated with the output device 720, for example, as a touchscreen or similar touch-sensitive display. In some embodiments, the input device 715 includes a touchscreen such that text may be input using a virtual keyboard displayed on the touchscreen and/or by handwriting on the touchscreen. In some embodiments, the input device 715 includes two or more different devices, such as a keyboard and a touch panel.

The output device 720, in one embodiment, is designed to output visual, audible, and/or haptic signals. In some embodiments, the output device 720 includes an electronically controllable display or display device capable of outputting visual data to a user. For example, the output device 720 may include, but is not limited to, an LCD display, an LED display, an OLED display, a projector, or similar display device capable of outputting images, text, or the like to a user. As another, non-limiting, example, the output device 720 may include a wearable display separate from, but communicatively coupled to, the rest of the network function apparatus 700, such as a smart watch, smart glasses, a heads-up display, or the like. Further, the output device 720 may be a component of a smart phone, a personal digital assistant, a television, a table computer, a notebook (laptop) computer, a personal computer, a vehicle dashboard, or the like.

In certain embodiments, the output device 720 includes one or more speakers for producing sound. For example, the output device 720 may produce an audible alert or notification (e.g., a beep or chime). In some embodiments, the output device 720 includes one or more haptic devices for producing vibrations, motion, or other haptic feedback. In some embodiments, all or portions of the output device 720 may be integrated with the input device 715. For example, the input device 715 and output device 720 may form a touchscreen or similar touch-sensitive display. In other embodiments, the output device 720 may be located near the input device 715.

The transceiver 725 includes at least transmitter 730 and at least one receiver 735. One or more transmitters 730 and one or more receivers 735 may be used to communicate with a base unit 110, such as the RAN node 210, and/or with other network functions in a core network. Although only one transmitter 730 and one receiver 735 are illustrated, the network function apparatus 700 may have any suitable number of transmitters 730 and receivers 735. Further, the transmitter(s) 725 and the receiver(s) 730 may be any suitable type of transmitters and receivers. Moreover, the transceiver 725 may support one or more network interfaces 740. For example, the transceiver 725 may support an N1 interface for communication with a UE, an N11 interface for communication with a SMF, and the like.

Figure 8:
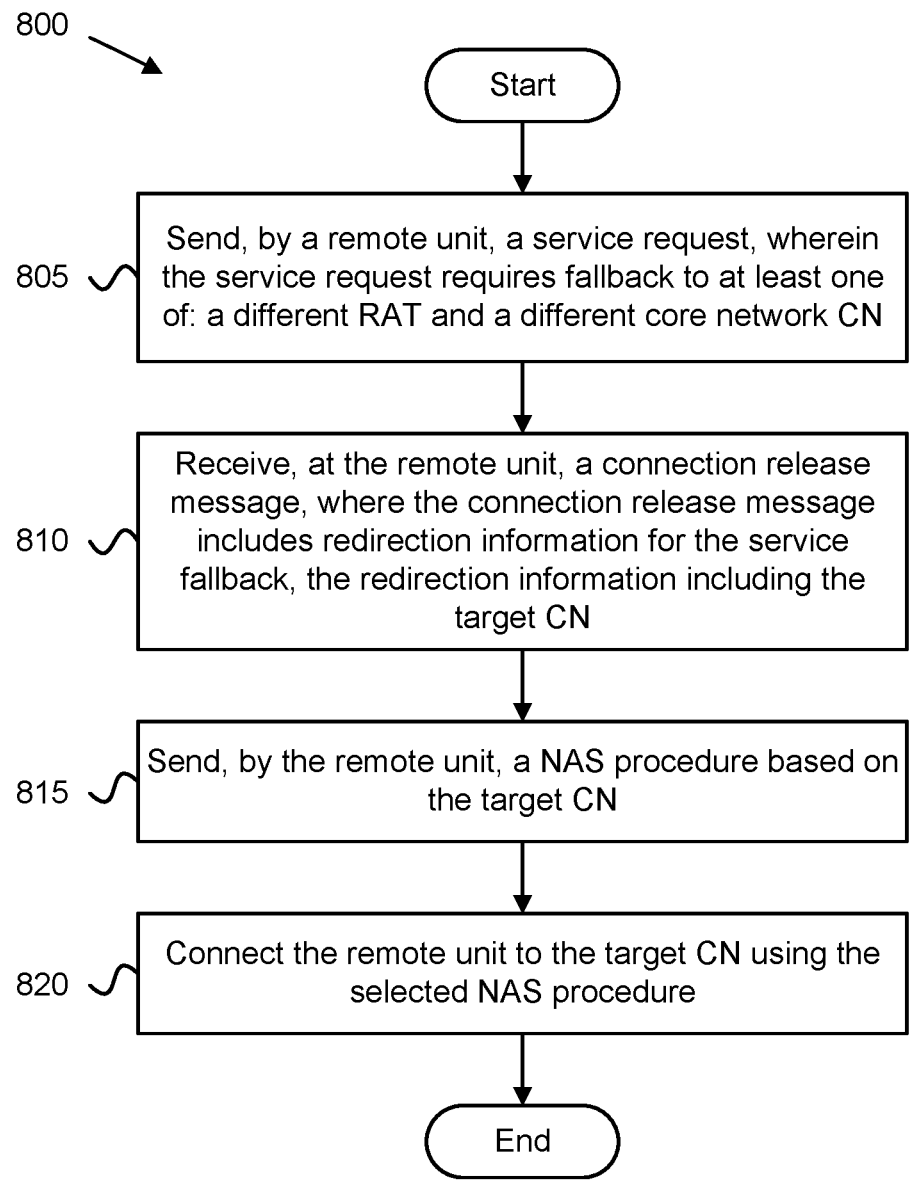
FIG. 8 is a schematic block diagram illustrating a first embodiment of a method for providing fallback assistance information to a RAN node.

FIG. 8 depicts a method 800 for providing fallback assistance information to a RAN node, according to embodiments of the disclosure. In some embodiments, the method 1000 is performed by an apparatus, such as the remote unit 105, the UE 205, and/or the user equipment apparatus 500. In certain embodiments, the method 800 may be performed by a processor executing program code, for example, a microcontroller, a microprocessor, a CPU, a GPU, an auxiliary processing unit, a FPGA, or the like.

The method 800 begins and sends 805, by a remote unit, a service request, wherein the service request requires fallback to at least one of: a different RAT and a different CN. In certain embodiments, sending 805 the service request includes indicating at least one of: type of the requested service and a radio capability of the remote unit, the radio capability including an indication of whether the remote unit is dual-transmission capable.

The method 800 includes receiving 810, at the remote unit, a connection release message, where the connection release message includes redirection information for the service fallback, the redirection information including a target CN. In some embodiments, the redirection information further includes target cell information indicating at least one RAT. In certain embodiments, the indicated RAT is E-UTRAN.

The method 800 includes selecting 815 a NAS procedure based on the target CN.

The method 800 includes connecting 820 to the target CN using the selected NAS procedure. The method 800 ends. In some embodiments, the NAS procedure in the target CN may be one of: an EPC NAS procedure and a 5GC NAS procedure. In various embodiment, the NAS procedure in the target CN may include initiating the requested service via the target CN.

Figure 9:
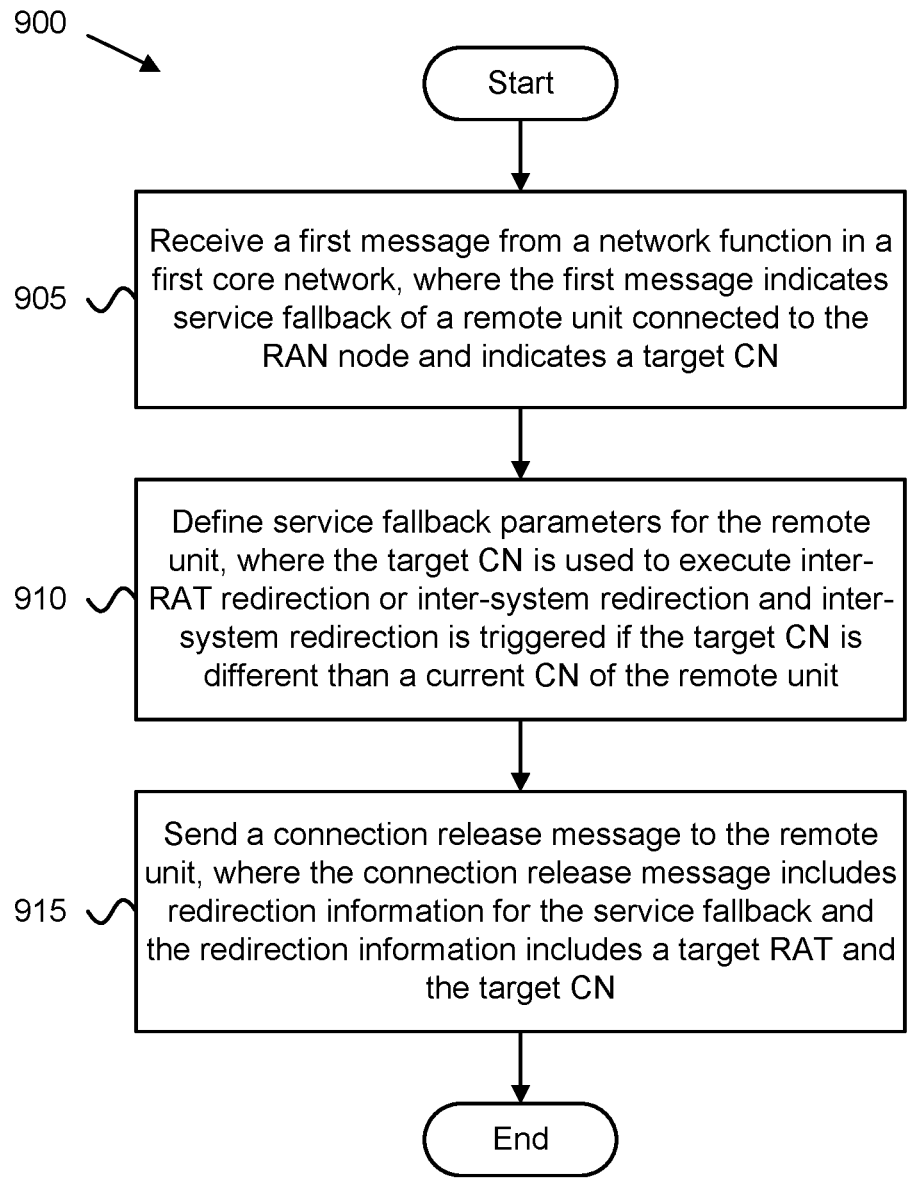
FIG. 9 is a schematic block diagram illustrating a second embodiment of a method be used for providing fallback assistance information to a RAN node.

FIG. 9 depicts a method 900 for providing fallback assistance information to a RAN node, according to embodiments of the disclosure. In some embodiments, the method 1000 is performed by a RAN node apparatus, such as the base unit 110, the RAN node 210, and/or the RAN apparatus 600. In certain embodiments, the method 900 may be performed by a processor executing program code, for example, a microcontroller, a microprocessor, a CPU, a GPU, an auxiliary processing unit, a FPGA, or the like.

The method 900 begins and receives 905 a first message from a network function in a first core network, wherein the first message indicates service fallback of a remote unit connected to the RAN node and indicates a target CN. In certain embodiments, the first message additionally includes RAN node information, wherein the RAN node information includes at least one of: UE security context and UE mobility restrictions. In certain embodiments, the first message includes target fallback information, the target fallback information including one or more of: a target RAT, the target CN, a target mobility type, a service request by the remote unit that triggered the service fallback, and criticality requirements of a data connection of the remote unit.

The method 900 includes defining 910 service fallback parameters for the remote unit. Here, the target CN is used to execute either inter-RAT redirection or inter-system redirection, where inter-system redirection is triggered if the target CN is different than a current CN of the remote unit. In certain embodiments, defining the service fallback parameters includes selecting a fallback RAT based on the target RAT and one or more of: radio topology, and radio conditions of the remote unit.

The method 900 includes sending 915 a connection release message to the remote unit, where the connection release message includes redirection information for the service fallback. Here, the redirection information includes a target RAT and the target CN. In some embodiments, the target CN is used to resolve the target RAT cell. The method 900 ends.

Figure 10:
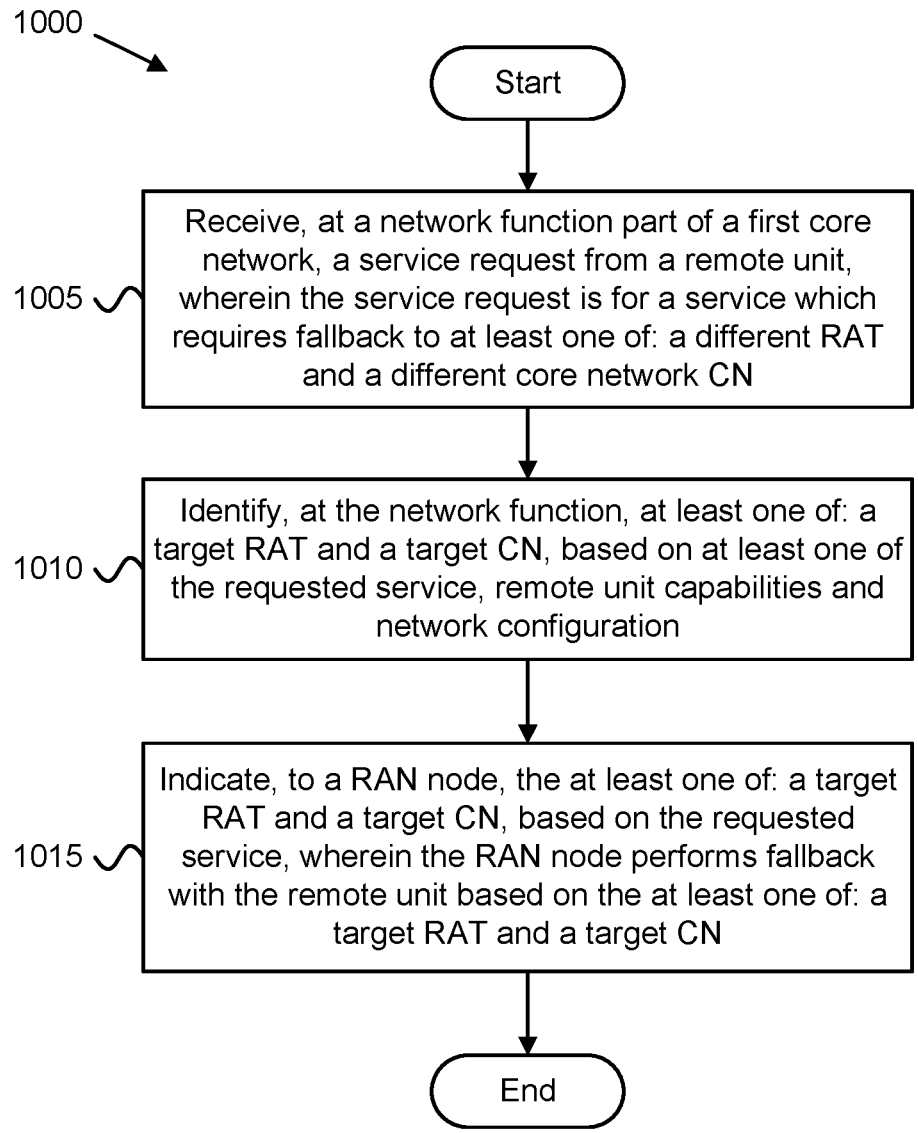
FIG. 10 is a schematic block diagram illustrating a third embodiment of a method for providing fallback assistance information to a RAN node.

FIG. 10 depicts a method 1000 for providing fallback assistance information to a RAN node, according to embodiments of the disclosure. In some embodiments, the method 1000 is performed by an apparatus, such as the AMF 131 and/or the network function apparatus 700. In certain embodiments, the method 1000 may be performed by a processor executing program code, for example, a microcontroller, a microprocessor, a CPU, a GPU, an auxiliary processing unit, a FPGA, or the like.

The method 1000 begins and receives 1005, at a network function part of a first core network, a service request from a remote unit, wherein the service request is for a service which requires fallback to at least one of: a different RAT and a different CN. In some embodiments, the service request indicates that the remote unit requires emergency services fallback.

The method 1000 includes identifying 1010, at the network function, at least one of: a target RAT and a target CN, based on at least one of: the requested service, remote unit capabilities and network configuration.

The method 1000 includes indicating 1015, to a RAN node, the at least one of: a target RAT and a target CN, based on the requested service, wherein the RAN node performs fallback with the remote unit based on the at least one of: a target RAT and a target CN. In certain embodiments, indicating the at least one of: a target RAT and a target CN, including sending at least one of: a prioritized list of target RATs and a prioritized list of CNs. In some embodiments, the network function sends a signaling message with fallback information to the RAN node, wherein the fallback information includes at least one of: a target RAT, a target tracking area, the request service, a mobility type, and service requirements of a data connection used by the remote unit.

Disclosed herein is a first apparatus for providing fallback assistance information. The first apparatus may be one embodiment of the remote unit 105, the UE 205, and/or the user equipment apparatus 500. The first apparatus includes a transceiver that sends a service request and receives a connection release message. Here, the service request requires fallback to at least one of: a different RAT and a different CN. Moreover, the connection release message includes redirection information for the service fallback, the redirection information including a target CN. The first apparatus includes a processor that selects a NAS procedure based on the target CN and connects to the target CN using the selected NAS procedure.

In some embodiments, the NAS procedure in the target CN is one of: an EPC NAS procedure and a 5GC NAS procedure. In various embodiments, the NAS procedure in the target CN includes initiating the requested service via the target CN. In certain embodiments, sending the service request includes indicating at least one of: type of the requested service and a radio capability of the remote unit, the radio capability including an indication of whether the remote unit is dual-transmission capable.

In some embodiments, the redirection information further includes at least one target cell indicating at least one RAT. In certain embodiments, the indicated RAT is E-UTRAN, wherein the processor further provides the target CN to one or more upper layers.

Disclosed herein is a first method for providing fallback assistance information. The first method may be implemented by the remote unit 105, the UE 205, and/or the user equipment apparatus 500. The first method includes sending, by a remote unit, a service request, wherein the service request requires fallback to at least one of: a different RAT and a different CN. The first method includes receiving, at the remote unit, a connection release message, where the connection release message includes redirection information for the service fallback, the redirection information including a target CN. The first method includes selecting a NAS procedure based on the target CN. The first method includes connecting to the target CN using the selected NAS procedure.

In some embodiments, the NAS procedure in the target CN may be one of: an EPC NAS procedure and a 5GC NAS procedure. In various embodiment, the NAS procedure in the target CN may include initiating the requested service via the target CN. In certain embodiments, sending the service request includes indicating at least one of: type of the requested service and a radio capability of the remote unit, the radio capability including an indication of whether the remote unit is dual-transmission capable.

In some embodiments, the redirection information further includes target cell information indicating at least one RAT. In certain embodiments, the indicated RAT is E-UTRAN. In such embodiments, the first method further includes providing the target CN to one or more upper layers in the remote unit.

Disclosed herein is a second apparatus for providing fallback assistance information. The second apparatus may be one embodiment of the base unit 110, the RAN node 210, and/or the RAN apparatus 600. The second apparatus includes a transceiver that receives a first message from a network function in a first core network, wherein the first message indicates service fallback of a remote unit connected to the RAN node and indicates a target CN. The second apparatus also includes a processor that determines service fallback parameters for the remote unit. Moreover, the transceiver sends a connection release message to the remote unit, the connection release message including redirection information for the service fallback, the redirection information including the target CN.

In some embodiments, the redirection information further includes a target radio access technology ("RAT"). In certain embodiments, the first message additionally includes RAN node information, wherein the RAN node information comprises at least one of: UE security context and UE mobility restrictions.

In some embodiments, the first message includes a target RAT. In such embodiments, determining the service fallback parameters includes selecting a fallback RAT based on the target RAT and one or more of: radio topology, and radio conditions of the remote unit.

In some embodiments, the first message includes target fallback information, the target fallback information including one or more of: a target radio access technology ("RAT"), the target CN, a target mobility type, a service request by the remote unit that triggered the service fallback, and criticality requirements of a data connection of the remote unit.

Disclosed herein is a second method for providing fallback assistance information. The second method may be implemented by the base unit 110, the RAN node 210, and/or the RAN apparatus 600. The second method includes receiving, at a RAN node, a first message from a network function in a first core network, wherein the first message indicates service fallback of a remote unit connected to the RAN node and indicates a target CN. The second method includes determining service fallback parameters for the remote unit and sending a connection release message to the remote unit, where the connection release message includes redirection information for the service fallback. Here, the redirection information includes the target CN.

In some embodiments of the second method, the redirection information further includes at least a target RAT. In certain embodiments, the first message additionally includes RAN node information, wherein the RAN node information includes at least one of: UE security context and UE mobility restrictions.

In some embodiments of the second method, the first message includes a target RAT. In such embodiments, determining the service fallback parameters includes selecting a fallback RAT based on the target RAT and one or more of: radio topology, and radio conditions of the remote unit. In certain embodiments, the first message includes target fallback information, the target fallback information including one or more of: a target RAT, the target CN, a target mobility type, a service request by the remote unit that triggered the service fallback, and criticality requirements of a data connection of the remote unit.

Disclosed herein is a third apparatus for providing fallback assistance information. The third apparatus may be one embodiment of the AMF 131 and/or the network function apparatus 700. The third apparatus includes a transceiver that receives a service request from a remote unit, wherein the service request requires fallback to at least one of: a different RAT and a different CN. The third apparatus includes a processor that identifies at least one of: a target RAT and a target CN, based on at least one of: the requested service, remote unit capabilities and network configuration. Moreover, the transceiver indicates, to a RAN node, the at least one of: a target RAT and a target CN, based on the requested service, wherein the RAN node performs fallback procedure with the remote unit based on the at least one of: a target RAT and a target CN. Here, performing fallback procedure includes one of:

In some embodiments, the service request indicates that the remote unit requires emergency services fallback. In certain embodiments, indicating the at least one of: a target RAT and a target CN, comprises sending at least one of: a prioritized list of target RATs and a prioritized list of CNs.

In some embodiments, the transceiver further sends a signaling message with fallback information to the RAN node, wherein the fallback information includes at least one of: a target RAT, a target tracking area, the request service, a mobility type, and service requirements of a data connection used by the remote unit.

In such embodiments, the mobility type indicates idle mode mobility of the remote unit, the transceiver receives an acknowledgment message from the RAN node, and the processor, in response to the acknowledgment message, performs one of: releasing a data connection used by the remote unit, suspending a data connection used by the remote unit, and handing over a data connection used by the remote unit.

Disclosed herein is a third method for providing fallback assistance information. The third method may be implemented by the AMF 131 and/or the network function apparatus 700. The third method includes receiving, at a network function part of a first core network, a service request from a remote unit, wherein the service request is for a service which requires fallback to at least one of: a different RAT and a different CN. The third method includes identifying, at the network function, at least one of: a target RAT and a target CN, based on at least one of: the requested service, remote unit capabilities and network configuration. The third method includes indicating, to a RAN node, the at least one of: a target RAT and a target CN, based on the requested service, wherein the RAN node performs fallback with the remote unit based on the at least one of: a target RAT and a target CN.

In some embodiments, the service request indicates that the remote unit requires emergency services fallback. In certain embodiments, indicating the at least one of: a target RAT and a target CN, comprises sending at least one of: a prioritized list of target RATs and a prioritized list of CNs.

In some embodiments, the third method includes sending a signaling message with fallback information to the RAN node, wherein the fallback information includes at least one of: a target RAT, a target tracking area, the request service, a mobility type, and service requirements of a data connection used by the remote unit.

In such embodiments, the mobility type indicates idle mode mobility of the remote unit, wherein the method further includes receiving an acknowledgment message from the RAN node and performing an action in response to the acknowledgment message, the action being one of: releasing a data connection used by the remote unit, suspending a data connection used by the remote unit, and handing over a data connection used by the remote unit.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
    sending, by a remote unit, a service request, wherein the service request indicates a service type requiring fallback to at least one of: a different radio access technology ("RAT") or a different system generation;
    receiving, at the remote unit, a connection release message, where the connection release message includes redirection information for the fallback, the redirection information including a target RAT cell and a target system; and
    performing a non-access stratum ("NAS") procedure from a plurality of NAS procedures supported by the remote unit, wherein the NAS procedure is based on the target system,
    wherein the NAS procedure establishes a connection to the target RAT and the target system.

2. The method of claim 1, wherein the NAS procedure based on the target system is one of: an evolved packet core ("EPC") NAS procedure or a fifth-generation core ("5GC") NAS procedure.

3. The method of claim 1, wherein performing the NAS procedure comprises initiating the requested service via the target system.

4. The method of claim 1, wherein the redirection information further includes target cell information indicating at least one RAT.

5. The method of claim 1, wherein the target RAT cell is an evolved universal terrestrial radio access network ("E-UTRAN"), the method further comprising providing the target system to one or more upper layers in the remote unit.

6. A method comprising:
receiving, at a radio access network ("RAN") node, a first message from a network function in a first core network, wherein the first message indicates service fallback of a remote unit connected to the RAN node and indicates a target system;
creating service fallback parameters for the remote unit, wherein the target system is used to execute one of: inter-RAT redirection and inter-system redirection, wherein inter-system redirection is triggered if the target system is different than a current system of the remote unit; and
sending a connection release message to the remote unit, where the connection release message includes redirection information for service fallback, the redirection information including a target radio access technology ("RAT") cell and the target system, wherein the target system is used to resolve the target RAT cell.

7. The method of claim 6, further comprising:
forwarding, by the RAN node, a service request to the network function, the service request sent by the remote unit, wherein the service request indicates that service fallback is required.

8. The method of claim 6, wherein the first message additionally comprises RAN node information, wherein the RAN node information comprises at least one of: UE security context or UE mobility restrictions.

9. The method of claim 6, wherein the first message comprises the target RAT cell, wherein determining the service fallback parameters includes selecting a fallback RAT based on the target RAT cell and one or more of: radio topology, and radio conditions of the remote unit.

10. The method of claim 6, wherein the first message comprises target fallback information, the target fallback information including one or more of: the target RAT cell, the target system, a target core network ("CN"), a target mobility type, a service request by the remote unit that triggered the service fallback, and criticality requirements of a data connection of the remote unit.

11. An apparatus comprising:
a transceiver that receives a first message from a network function, wherein the first message indicates service fallback of a remote unit and indicates a target system; and
a processor that creates service fallback parameters for the remote unit, wherein the target system is used to execute one of: inter-RAT redirection and inter-system redirection, wherein inter-system redirection is triggered if the target system is different than a current system of the remote unit,
wherein the transceiver sends a connection release message to the remote unit, the connection release message including redirection information for the service fallback, the redirection information including a target radio access technology ("RAT") cell and the target system, wherein the target system is used to resolve the target RAT cell.

12. The apparatus of claim 11, wherein the first message includes the target RAT cell, wherein, to create the service fallback parameters, the processor selects a fallback RAT based on the target RAT cell and one or more of: radio topology, and radio conditions of the remote unit.

13. The apparatus of claim 11, wherein the first message includes target fallback information, the target fallback information including one or more of: the target RAT cell, the target system, a target core network ("CN"), a target mobility type, a service request by the remote unit that triggered the service fallback, and criticality requirements of a data connection of the remote unit.

14. The apparatus of claim 11, wherein the first message additionally comprises RAN node information, wherein the RAN node information comprises at least one of: UE security context or UE mobility restrictions.

15. A method comprising:
receiving, at a network function part of a first core network, a service request from a remote unit, wherein the service request is for a service which requires fallback to at least one of: a different radio access technology ("RAT") or a different system; and
indicating, to a radio access network ("RAN") node, the at least one of: a target RAT or a target system, based on a requested type of the service request or based on a network configuration,
wherein the RAN node performs fallback with the remote unit based on the at least one of: the target RAT and the target system.

16. The method of claim 15, wherein the service request indicates that the remote unit requires emergency services fallback.

17. The method of claim 15, wherein indicating the at least one of the target RAT or the target system comprises sending at least one of a prioritized list of target RATs or a prioritized list of systems.

18. The method of claim 15, further comprising sending a signaling message with fallback information to the RAN node, wherein the fallback information includes at least one of: a target RAT, a target tracking area, the request service, a mobility type, or service requirements of a data connection used by the remote unit.

19. The method of claim 18, wherein the mobility type indicates idle mode mobility of the remote unit, the method further comprising:
receiving an acknowledgment message from the RAN node; and
performing an action in response to the acknowledgment message, the action being one of: releasing a data connection used by the remote unit, suspending a data connection used by the remote unit, or handing over a data connection used by the remote unit.

* * * * *

UNITED STATES PATENT AND TRADEMARK OFFICE
CERTIFICATE OF CORRECTION

| | | |
|---|---|---|
| PATENT NO. | : 11,477,702 B2 | Page 1 of 1 |
| APPLICATION NO. | : 17/121630 | |
| DATED | : October 18, 2022 | |
| INVENTOR(S) | : Genadi Velev et al. | |

It is certified that error appears in the above-identified patent and that said Letters Patent is hereby corrected as shown below:

In the Claims

Column 26, Claim 1, Lines 56-57:
"wherein the NAS procedure establishes a connection to the target RAT and the target system"
Should read:
"wherein the NAS procedure establishes a connection to the target RAT cell and the target system"

Signed and Sealed this
Twenty-seventh Day of December, 2022

Katherine Kelly Vidal
*Director of the United States Patent and Trademark Office*